Inventor:
William E. Glenn Jr.,
by John P. Dellitt
His Attorney.

Inventor:
William E. Glenn Jr.,
by John P. Dellitt
His Attorney.

Inventor:
William E. Glenn Jr.,
by John P. DeWitt
His Attorney.

United States Patent Office 3,335,413

Patented Aug. 8, 1967

3,335,413

WIDE BAND OPTICAL RECORDING AND NARROW BAND REPRODUCTION ON A THERMOPLASTIC MEDIUM

William E. Glenn, Jr., Scotia, N.Y., assignor to General Electric Company, a corporation of New York Filed Dec. 19, 1963, Ser. No. 331,662
12 Claims. (Cl. 340—173)

Figures 1, 1A:
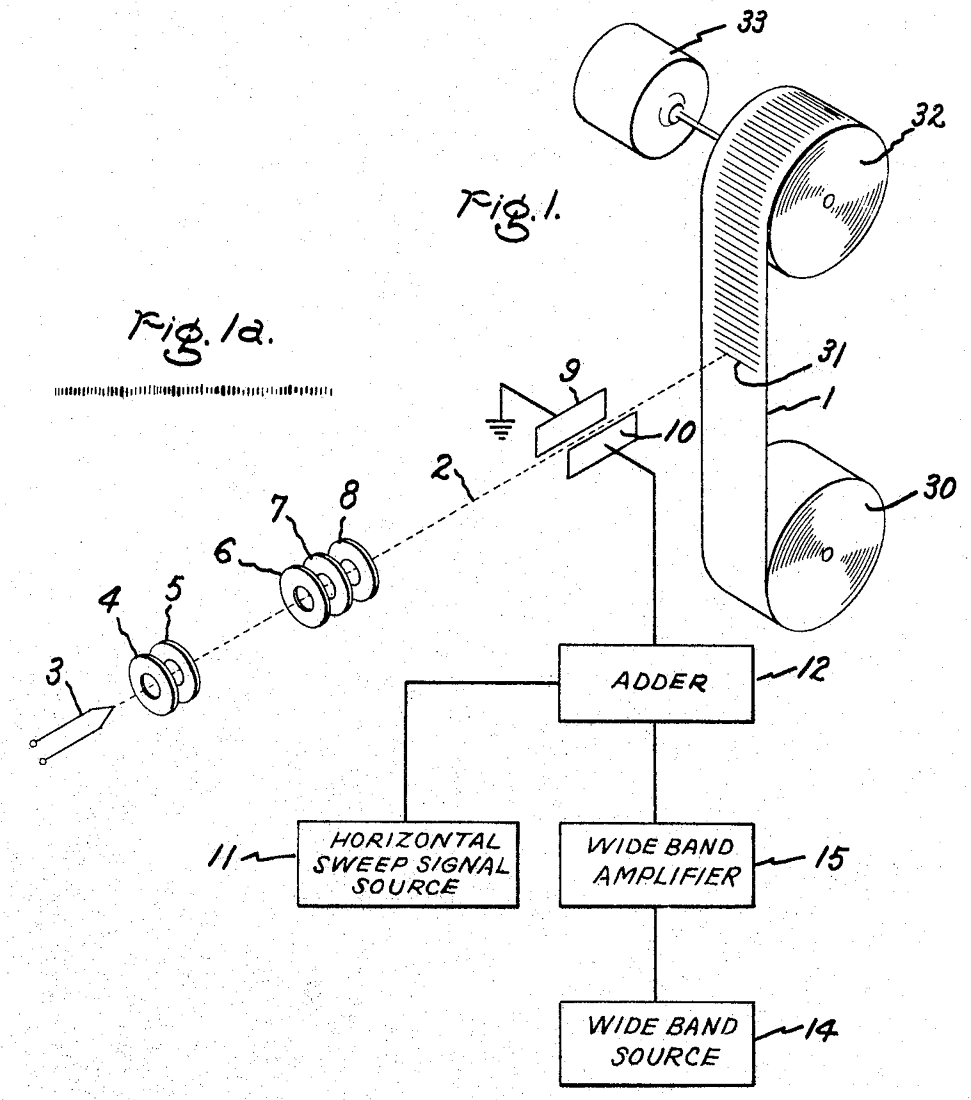

This invention relates to an optical recording system and particularly to such a system for recording wide band electrical signals and for reading out narrow band electrical signals.

In my patent Re. 25,169, granted May 15, 1962, there is disclosed and claimed a system for producing color images corresponding to an electrical signal. In the patented system an input electrical signal acts to establish deformation patterns in a deformable optical medium. These patterns, which are capable of deflecting or modulating light applied to the medium, are generally in the nature of diffraction phase gratings having a first parameter corresponding to a given color component of input signal and a second parameter corresponding to the intensity of such component. When properly illuminated in a projection system, the deformation gratings deflect light around a set of bars to produce a color image useful in color television applications and the like. In addition to the production of color images, the deformation or grating in an optical light modulating medium is capable of representing certain other types of information, for example numerical or digital information arranged in high concentration as set forth and claimed in my copending application Ser. No. 783,558, filed December 29, 1958, now abandoned in favor of continuation-in-part application Ser. No. 472,749, filed June 11, 1965, and issued Oct. 25, 1966, as Patent No. 3,281,798, and assigned to the assignee of the present invention. Digital information as well as pictorial image information can be recorded permanently or semi-permanently upon a plastic optical medium of the type set forth and claimed in my copending application Ser. No. 84,424, filed Jan. 23, 1961, now Patent No. 3,147,062, dated Sept. 1, 1964, a division of my application Ser. No. 8,842, filed Feb. 15, 1960, now Patent 3,113,179, dated Dec. 3, 1963 and entitled "Method and Apparatus for Recording".

In addition to the foregoing types of information, I have discovered that other types, as a matter of fact nearly any type, of electrical signal information is recordable as deformation patterns in an optical medium. In particular, electrical signals of quite wide bandwidth are recordable in this manner. A wide band electrical input signal can be viewed as made up of a number of narrow band portions or components in a multiplexed combination. I have found the wide band electrical signal is quite easily recorded, for example as by employing an electron-beam-scan to induce thickness deformation elements forming a diffraction grating in an optical medium as hereinafter more fully described. However recovering the original narrow band components is more difficult. The information can, of course, be read out grating-element-by-grating-element to reproduce the same wide band signal as recorded. For this purpose a television camera tube can be used to scan the recorded elements consecutively. Then narrow band portions of the signals are separated using electrical filtering and the like. However, this method is expensive and requires extensive electronic equipment.

It is therefore an object of the present invention to provide an improved method and apparatus for recording wide band signals made up of narrow band components, and for efficiently and economically detecting these components.

Briefly in accordance with the present invention, in one embodiment thereof a continuous-frequency-spectrum wide band electrical input signal, which may include narrower band components, is recorded as a deformation pattern in an optical medium capable of modulating light. The deformation pattern preferably consists of thickness deformations defining a diffraction grating in an optical medium formed of thermoplastic material. This deformation pattern is produced in response to an electric charge pattern conveniently written by an electron beam under the control of the input signal.

After or during recording of the input signal in this manner, selected narrow band portions of the wide band input signals are read out. To this end, the optical medium, and particularly the deformation pattern or diffraction grating therein, is illuminated, yielding a light deviation pattern or spectrum. Detection means views a portion of this spectrum through a relatively narrow adjustable slit defined by an opaque obstruction on either side of such slit. The detection means appropriately comprises a photocell. A selected narrow band portion of the input signal is conveniently detected depending upon the placement of the slit or the displacement of the spectrum. As a result, the wide band electrical signal is recorded and any narrow band portion thereof may be conveniently read out.

Figure 2:
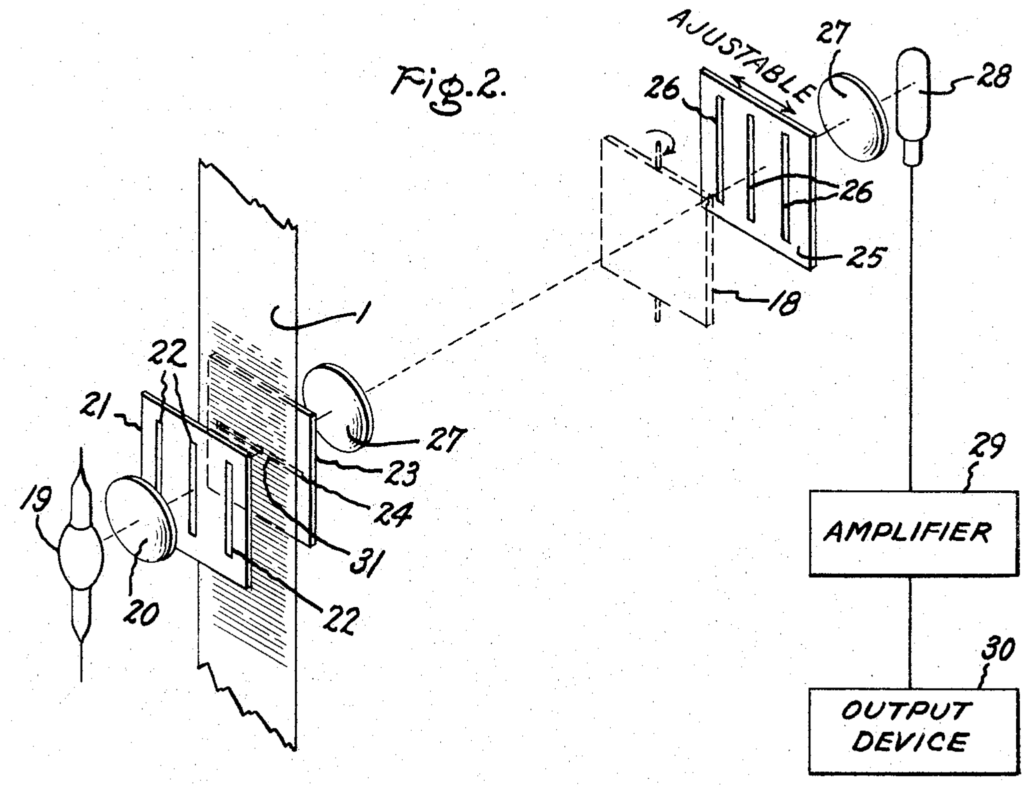
Figure 3:
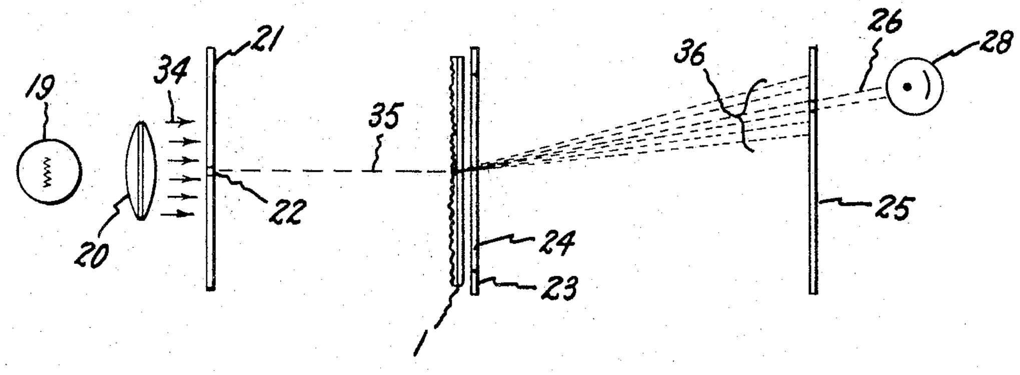
Figure 4:
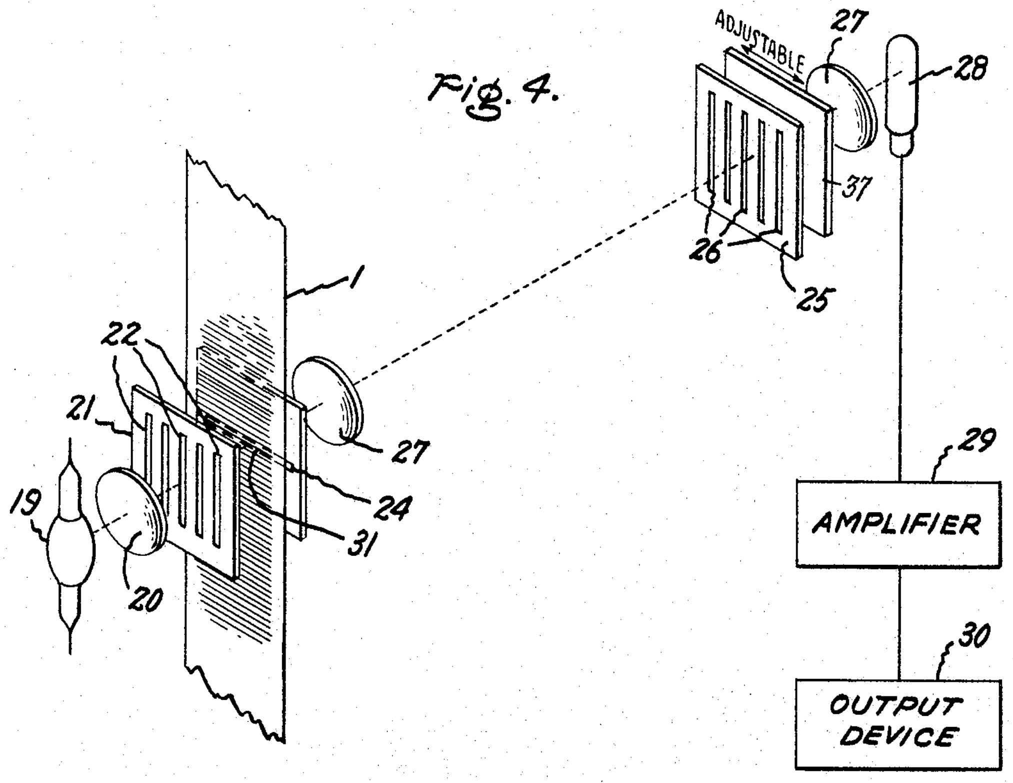
Figure 5:
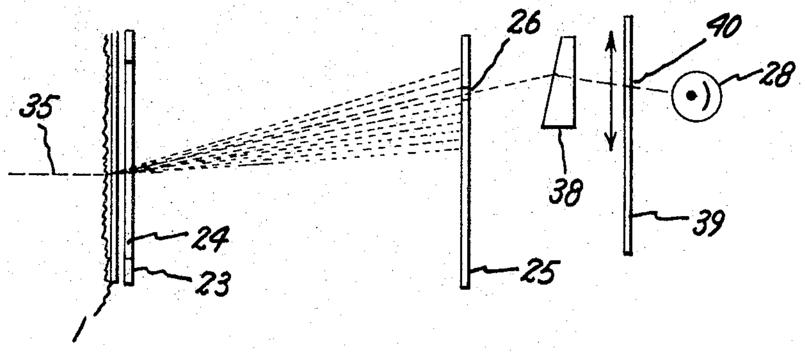

The subject matter which I regard as my invention is particularly pointed out and distinctly claimed in the concluding portion of this specification. The invention, however, both as to organization and method of operation, together with other objects and advantages thereof, may best be understood by reference to the following description taken in connection with the accompanying drawing wherein like reference characters refer to like elements and in which:

FIG. 1 is a perspective view of an electron beam writing apparatus for a wide band optical recording system in accordance with the present invention, FIG. 1*a* is an illustration of one line of sweep produced by the FIG. 1 electron beam writing apparatus, FIG. 2 is a perspective view of a read out system in accordance with the present invention wherein narrow band components of the wide band recorded information are conveniently read out, FIG. 3 is an explanatory drawing illustrating principles of operation according to the FIG. 2 read out system, FIG. 4 is a perspective view of another read out system in accordance with the present invention, and FIG. 5 is an explanatory drawing illustrating principles of operation according to the FIG. 4 read out system.

Before describing the invention in detail, the recording of information in the form of deformation patterns in an optical medium, as well as the reading out thereof, will be generally described. In FIG. 1 an optical storage means in the form of a deformable medium, 1, is located to receive electrical charges from electron beam 2. The source of the electron beam conveniently comprises components similar to those of a conventional cathode ray tube. The region of medium 1 and the electron beam source is evacuated to facilitate generation of the electron beam. The beam source includes a filament 3 which is heated by a source of electrical energy, not shown, connected across its terminals. Preferably filament 3 is maintained at a large negative potential below ground with respect to other electrodes of the electron beam source. The beam of electrons 2 emitted by filament 3 is directed through an annular grid electrode 4 and an annular anode electrode 5, the latter being maintained at ground potential. The beam potential is equal to the difference potential between anode 5 and filament 3 and this difference is equal to the magnitude of the negative potential applied to filament 3. The electron beam is then focused by means of a system illustrated as an einzel lens comprising three more annular electrodes 6, 7 and 8. The center electrode, 7, is maintained at several kilovolts, preferably negative, while electrodes 6 and 8 are grounded.

Deflection plates 9 and 10 are disposed on either side of the electron beam after it has passed through the einzel lens for the purpose of horizontally deflecting the beam across medium 1. Horizontal sweep signal source 11 delivers a conventional sawtooth horizontal sweep voltage to adder 12 and thence to deflection plate 10. The remaining deflection plate 9 is returned to ground. The horizontal sweep voltage from source 11 is substantially similar to that found in television receivers and produces a horizontal line trace 31 across medium 1.

The output of amplifier 15, representing the signal input being recorded, is of considerably smaller amplitude than the voltage from horizontal sweep signal source 11. It is added to the sweep voltage in adder 12 causing an oscillatory variation in the overall horizontal deflection. This variation is one of alternately speeding up and slowing down the horizontal pass of the electron beam at a frequency or frequencies determined by the signal. When the beam 2 is caused to slow down in its horizontal pass, an electric charge of increased density is deposited upon medium 1. When the beam is caused to speed up, a decrease in charge density results. The line of horizontal sweep is illustrated in more detail in FIG. 1*a*, wherein the areas of increased charge density are more heavily shaded.

The optical medium 1 preferred in the embodiment of FIGS. 1 and 2 is a plastic tape of the type set forth and claimed in my aforementioned application Ser. No. 84,424, a division of my application Ser. No. 8,842, now Patent 3,113,179. Briefly this tape comprises a base material carrying a thermoplastic coating, which coating is oriented towards the impinging electron beam 2 in FIG. 1. The base material is optically clear and smooth and may suitably comprise four mils thick optical grade polyethylene terephthalate sold under the name Cronar. The thermoplastic layer oriented towards the electron beam is also optically clear, having a substantially infinite room temperature viscosity and a relatively fluid viscosity at a temperature of 100–150° C. One satisfactory thermoplastic material is a blend of polystyrene, m-terephenyl and a copolymer of 95 weight percent butadiene and 5 weight percent styrene. Specifically, the composition may be 70 percent polystyrene, 28 percent m-terephenyl, and 2 percent of the copolymer. The thermoplastic film thickness can vary from about 0.01 mil to several mils, with the preferred thickness being about equal to the distance between desired depressions in the film for forming the diffraction grating elements, e.g. on the order of approximately 7 microns or approximately 0.3 mil. Between the base material and the thermoplastic recording layer there is disposed an electrically conducting but transparent layer, for example a thin cuprous iodide or chromium metal film.

The electron beam acts to establish the deformation patterns in the form of diffraction phase gratings in the following manner. As the electron beam traces along a horizontal line in medium 1 in FIG. 1, it is speeded up and slowed down in the aforementioned manner in accordance with the signal being recorded. As previously mentioned, as the beam tracing speed periodically changes, it produces areas of charge buildup along the tracing line as illustrated in FIG. 1*a*. During or after the time electron beam 2 records a charge pattern, the medium 1 is heated to a temperature in excess of 100° C. by means not shown. This temperature produces a relatively fluid viscosity in the thermoplastic material. The areas of charge along the tracing line are then drawn to the conducting layer lying between the thermoplastic material and the Cronar base. The drawing of the charge towards the conducting layer produces thickness depressions in the medium corresponding at the charged areas. There now exists in the tape a physical deformation phase grating physically duplicating the grating spacing of the charge pattern. The tape is permitted to cool rather quickly whereby the thickness deformation recording becomes substantially permanent in the tape. An alternative form of optical medium is described and claimed in my Patent 2,943,147, assigned to the assignee of the present invention.

During recording in FIG. 1, the medium 1 in the form of a thermoplastic tape of the type described above is unreeled from a first reel 30, past an electron beam 2, and then upon a second reel 32. A motor 33 drives tape roll 32 at a constant speed. Then successive lines of charge are deposited upon the medium 1 by the sweeping electron beam 2 as the tape is transported past the beam in a direction perpendicular to the tracing direction. The joint action of tape transport and electron beam deflection produces upon medium 1 a plurality of tracing lines similar to that found in a television display. However, in the present device, the tape movement is substantially continuous and the tracing lines are not divided into pictures or frames.

The basic purpose and function of the diffraction grating deformations will become clearer upon consideration of the read out apparatus illustrated in FIG. 2. Referring then to FIG. 2, light from a source 19, which is preferably a monochrome source, is condensed by a lens 20 to fall substantially perpendicularly upon a first bar system or mask 21. Bar system 21 is provided with a system of spaced vertical slits 22 of narrow width dimension. Recording medium 1 is disposed in front of slits 22 to be illuminated thereby, each of the narrow slits 22 appearing as a narrow line light source to the medium 1. Immediately beyond medium 1 is disposed a stop 23, having a horizontal slot or aperture 24 therein preferably located in close registry with one horizontal line of recording on medium 1, for example, line 31, or in registry with an image thereof. The aperture may be located on either side of the medium. Accordingly one horizontal line trace will be observed or detected, at one time, in the present system.

Beyond stop 23, a bar system or mask 25 is provided having narrow vertical slits 26 somewhat similar to those found in bar system 21. A lens 27 is located in the light path between bar system 21 and bar system 25 for the purpose of imaging the light from slits 22 upon bar system 25 between the slits 26 when no information is recorded upon medium 1. In the presence of recording on medium 1, for example in the presence of thickness deformations along line 31 in registry with slit 24, the deformations will deflect some of the light from source 19 away from the image of slits 22 on bar system 25. Bar system 25 is adjusted in the direction illustrated such that a portion of this deflected light passes through slits 26. The angle of deflection or diffraction produced can be determined in accordance with the following diffraction formula:

$$\frac{n\lambda}{d}=\sin\theta_n$$

where $\lambda$ is the wavelength of the light under consideration, $d$ is the spacing between diffraction grating elements along tracing line 31, and $\theta_n$ is the angle formed between $n^{th}$ order diffracted light and a line perpendicular to the medium. "$n$" may be an integer, usually one. The diffracted light passing through slits 26 is focused by lens 27 upon a detection means 28 conveniently comprising a photocell. The output of the photocell is amplified with amplifier 29 and then provided to output device 30. As thus appears, deformations resulting from charge patterns produced along the horizontal tracing line 31 in FIG. 1 are capable of generating a current received at output device 30 in FIG. 2. In the case of a plastic tape medium, reading out is ordinarily accomplished subsequent to recording. However in the case of the medium set forth in my aforementioned Patent 2,943,147, recording and read out may be accomplished substantially simultaneously.

In accordance with a feature of the present invention, the input signal recorded in FIG. 1 is a continuous wide band signal, which may have a bandwidth of one megacycle or more. This wide band signal is illustrated as originating at wide band source 14 and provides an input to wide band amplifier 15. The frequency band of the wide band input signal, in conjunction with the sweeping speed of horizontal sweep signal 11, determines the spacing of deformations or grating elements along the tracing line in the medium 1 in FIG. 1, while the grating amplitude is determined by the intensities of the wide band input signal. Therefore the horizontal sweeping speed of source 11 is set to a value such that the wide band input signal produces diffraction grating elements along the tracing line 31 of spacing capable of deflecting light towards and through slits 26 on bar system 25 as illustrated in FIG. 2. In a particular example the horizontal sweep rate was 15 kilocycles along a 20 mil line trace length. Not all the light deflected at medium 1 passes slits 26. The incident light is spread at medium 1 into a light deviation pattern or spectrum corresponding to input frequency, and only a selectable portion thereof is seen through slits 26 by the photocell 28. The bar system 25 is adjustable in a horizontal direction in accordance with one embodiment of the invention so that a particular selected narrow portion of the deviation pattern passes through narrow slits 26 and this represents a narrow band portion of the wide band input signal. As an alternative to a moveable bar system 25, a moveable or rotatable glass plate 18 may be placed in front of slits 26 for simulating movement of the slits themselves. The theory and operation for providing the selection of a narrow band portion of input will be more fully explained in conjunction with FIG. 3.

In FIG. 3 there is illustrated a plan view in somewhat simplified and explanatory form of the FIG. 2 optical system. In FIG. 3, light 34 falling upon bar system 21 passes through a slit 22, the slit 22 appearing as a fine line source of light. This fine line source of light casts a beam 35 upon deformation recording 1. A slot 24 (not shown in its entirety) in stop 23, however, permits the light to be effective to read information from only one line at a time of the thickness deformation recording in medium 1.

Deformation patterns in medium 1 in the form of a diffraction grating deflects light beam 35 passing therethrough at an angle depending upon the grating spacing of the particular line of trace viewed. Inasmuch as the input signal reproduced in the grating is wide band, the grating will be complex resulting in a continuous wide deviation pattern or what will be termed a deviation spectrum of output light beams, 36. This spectrum does not all reach photocell detection means 28. Rather, bar system 25 is moveable including a narrow slit 26 positioned so that detection means 28 receives light from only a narrow portion of the spectrum. The amplitude of the light in this narrow portion of the spectrum is representative of and carries intelligence from only a narrow band portion of the wide band input signal. The light which passes the slit corresponds to the average instantaneous amplitude of the selected narrow band portion during the particular line of trace viewed.

The slit 26 can be quite narrow to register almost as narrow a narrow band portion of the input signal as desired. The minimum bandwidth which can be detected and hence the minimum slit width is limited by the sweep linearity and scan duration. Assuming a one per cent tolerance in sweep linearity, and a 15 kilocycle sweep frequency secured from a reasonably linear television type horizontal sweep signal source, a 10 kilocycle selectivity can be achieved at slit 26. In this instance, the wide band signal recorded may be on the order of about one megacycle bandwidth or approximately 100 times the selectivity (with one percent sweep linearity tolerance). If very wide bandwidths are to be recorded and detected, either the sweep linearity or sweep frequency may be increased, or the received wide band input information may be broken into channels. For example, for a ten megacycle bandwidth input signal, it may be desirable to provide ten one-megacycle channels.

Although one input slit, 22, and one output slit, 26, is illustrated in FIG. 3, it is understood a plurality of spaced input and output slits are employed as illustrated in FIG. 2. Also in FIG. 2, means, not shown, are employed for translating the medium 1 in the same manner and direction as illustrated in FIG. 1. Therefore one tracing line 31 after another registers with slit 24 and is illuminated to provide its information. The speed of translation of medium 1 is the same as in FIG. 1 where it is determined such that separate lines of trace 31 are produced upon medium 1 when the tracing speed is, for example, 15 kilocycles per second. In FIG. 2, the grating provided by each line of trace on medium 1 produces its own distinct spectrum 36 in FIG. 3 but the motion of the medium causes the successive lines of trace to be read out in such rapid succession as to form a continuous output.

As noted, a flat glass plate 18 may be rotated to provide selection of a narrow band portion of the spectrum, bar system 26 being left stationary. This rotation deflects the light deviation spectrum by a desired amount so that a selected portion of the light deviation spectrum passes slits 26 in accordance with the angle glass 18 makes with the beam of light.

The light may be made monochromatic anywhere in the system. If desired plate 18 may be made dichloric, i.e., passing substantially one color, source 19 being polychromatic, or the source may be polychromatic with the color-filters placed in the light path.

Instead of moving the position of slits 26 by moving bar system 25, or plate 18, polychromatic light with color filtering may be used to select the desired narrow band portion of the spectrum as illustrated in FIG. 4. The FIG. 4 embodiment is substantially the same as that shown in FIG. 2 as regards like components having like reference numerals. In the FIG. 4 embodiment, a color filter 37 separates bar system 25 and detection means 28. In this embodiment the bar system 25, including slits 26, is left in a stationary position. Light source 19 in this instance is polychromatic, i.e., a source of white light.

The diffraction grating in medium 1 is effective not only to deflect the polychromatic light into a light deviation spectrum in accordance with the wide band signal recorded, but is effective to divide the light into its various colors in the form of a color spectrum. In effect, the diffraction gratings in the light modulating medium produce deviation of a band of colors rather than one single color. The width of slits 26 are adjusted so that one particular color or narrow band of color is passed. Just what this color will be is dependent upon the amount of deviation produced in medium 1. For instance, if the light is deviated by a small amount in medium 1, color in the red end of the spectrum may pass a given slit 26. If a greater deviation takes place, light nearer the blue end of the spectrum may pass the same stationary slit. In this arrangement the color passing the stationary slit is indicative of the amount of deviation caused by the diffraction grating in medium 1, and the deviation is in turn dependent upon the frequency or frequencies contained in the wide band signal recorded. Thus, a particular narrow band portion of the wide band signal is selected by color filter 37. Since this filter will pass only one color or a narrow band portion of the color spectrum, tuning in this embodiment can be accomplished by changing the color transmission of filter 37. Thus a continuous filter having a varying color transmission characteristic along the tranverse direction thereof can be moved in a direction transverse to the light path in order to variably select color of light which will affect detection means 28.

Another arrangement for variably selecting the narrow band signal which will be selected is illustrated in the simplified diagram of FIG. 5 wherein again like reference numerals refer to like components. In this instance a prism 38 or similar light spectrum deviating means is inserted between slit 26 and detection means 28. The prism 38 is effective when used with the FIG. 4 embodiment to bend different colored light at different angles. Therefore a particular color is readily chosen employing a moveable secondary bar system 39 having a slit 40 which passes one color or narrow band of color. It is seen a limited band of color may be selected by positioning slit 40.

Thus in accordance with the present invention a wide band signal is recorded, and any narrow band portion thereof is readily selected in a simple optical manner with out complex electronic filtering. Moreover, the filtering produced by the optical system is quite sharp and readily adjustable. The recording in accordance with the present invention is quite useful in transcribing a complete wide band radio or audio spectrum after which narrow band portions thereof may be read back; moreover, a combination multiplex signal for example of the teletype variety may be recorded and individual teletype messages read out. In one striking example, the wide band signal recorded comprised the entire radio standard broadcast band from approximately 500 kilocycles to approximately 1500 kilocycles constituting a one megacycle bandwidth. The recording speed (15 kilocycles along a 20 mil line) and linearity of the equipment permitted approximately 10 kilocycles selectivity, which in turn accommodated approximately 5 kilocycle audio information. By moving the bar system 25 in FIG. 2 to various locations, or by moving a plate 18, individual broadcasting stations were readily tuned in and out.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A method of recording information carried by wide band carrier frequencies and reading a narrow band portion thereof comprising converting said information into deformations on a light modulating medium having different spacings corresponding respectively to said frequencies and capable of deflecting monochromatic light by different amounts to produce a light deviation spectrum in response to the information stored, and reading only a narrow band portion of the information stored by illuminating said modulating medium, and detecting monochromatic light deflected by only those deformations corresponding to a narrow band of frequencies.

2. A method of recording a wide band channel and reading a narrow band portion thereof comprising forming diffraction gratings in a light modulating medium, said gratings having spacings in proportion to the frequency components of said wide band channel and respectively capable of deflecting light of a given frequency by different amounts, said gratings having a parameter varying in accordance with the value of said components, and reading out the recorded information as narrow band channels by illuminating said gratings, and detecting only monochromatic light deflected by gratings having spacings corresponding to a narrow band of said frequency components.

3. A recording system for recording wide band information comprising an optical medium, means for producing diffraction gratings upon said optical medium, said gratings having spacings dependent upon the frequency components of wide band information recorded capable of deflecting monochromatic light corresponding to the different frequency components by different amounts, means for illuminating said medium, and read out means for detecting only the portion of monochromatic light diffracted by certain of said diffraction gratings to read out a narrow band portion of the information recorded.

4. A system for recording information comprising an optical medium which is deformable in accordance with electric charge, an electron generating means producing an electron beam deflected to deposit lines of electric charge on said medium, further deflection means imparting an oscillatory change in the concentration of charge deposited to control the formation of thickness deformation diffraction gratings in said optical medium in response to continuous wide band input information capable respectively of producing different amounts of diffraction of light of a given frequency corresponding respectively to the different frequency components of said wide band input, monochromatic light means for illuminating said medium, and an effectively adjustable narrow slit for viewing a narrow portion of the light deviation spectrum produced by the diffraction gratings to pass only monochromatic light diffracted by deformations corresponding to a narrow band of said wide band input, light detection means located in the path of light beyond said narrow slit to read out information carried by said narrow band of frequencies, and means limiting the light falling on said light detection means at any instant to that controlled by deformations recorded over a time interval which is shorter than the period corresponding to the frequencies to be detected.

5. The system according to claim 4 further including means for producing relative movement between said electron beam and said medium so that successive lines of recording may be recorded and read out.

6. A system for recording information comprising an optical medium which is deformable in accordance with electric charge, an electron beam generating means producing an electron beam deflected to deposit lines of electric charge on said medium, further deflection means imparting an oscillatory change in the concentration of charge deposited to control the formation of thickness deformation diffraction gratings along said lines in said optical medium in response to continuous wide band input information corresponding respectively to different frequencies of said wide band input, means for producing relative movement between said electron beam generating means and said medium so that a plurality of adjacent lines are successively recorded each including diffraction grating elements therealong, light means for illuminating said medium with light of a given frequency, an effectively adjustable narrow slit for passing only the light deviated by the diffraction gratings corresponding to a narrow band of the recorded frequencies, detecting means responsive to light passed by said narrow slit to read out a selected narrow band portion of the information recorded, and means limiting the light transmitted to said detecting means at any instant to that controlled by deformations recorded over a period of time which is shorter than the period of the narrow band output to be detected.

7. The system according to claim 6 wherein said medium comprises a plastic tape transported past said electron beam generating means in a direction substantially orthogonal to the lines of charge thereon.

8. A system for recording information comprising an optical medium which is deformable in accordance with electric charge, an electron generating means deflected to deposit lines of electric charge on said medium, further deflection means imparting an oscillatory change in the concentration of charge deposited to control the formation of thickness deformation diffraction gratings in said optical medium in response to continuous wide band input information, said gratings having different spacings corresponding respectively to the different frequencies of said wide band input and capable of deflecting light of a given frequency by different amounts, polychromatic light means for illuminating said medium and transmitting light controlled by not more than one line of diffraction gratings at a time, a narrow slit for viewing only a limited color spectrum deviated by any one grating spacing and color filter means for selecting a narrow band of color from the light transmitted through said narrow slit, and means responsive to the light transmitted by said color filter to detect the information carried by a narrow band portion of said wide band input.

9. The system according to claim 8 wherein said color filtering means is located on the side of said narrow slit remote from said polychromatic light means.

10. A system for recording information comprising an optical medium which is deformable in accordance with electric charge, an electron generating means deflected to deposit lines of electric charge on said medium, further deflection means imparting an oscillatory change in the concentration of charge deposited to control the formation of thickness deformation diffraction gratings in said optical medium in response to wide band input information, polychromatic light means for illuminating said medium and transmitting light controlled by not more than one line of diffraction gratings at a time, a narrow slit for viewing a narrow portion of the color and light deviation spectrum produced by the diffraction gratings for reading out a narrow band portion of the information recorded, means located beyond said slit for producing a further deviation in light passing through said slit in accordance with the frequency of color thereof, and an adjustable slit for passing a narrow portion of this color deviation.

11. An optical method for filtering a narrow band signal from a wide band signal comprising converting said wide band signal into deformations on a light modulating medium capable of deflecting monochromatic light into a light deviation spectrum, and reading only selectable portions of the wide band signal by illuminating said light moduating medium so that said deformations produce said spectrum, and selectably detecting only monochromatic light corresponding to a narrow portion of said spectrum.

12. A system for recording and reading information comprising an optical medium in the form of a plastic tape which is deformable in accordance with electric charge, an electron beam generating means producing an electron beam deflected to deposit successive lines of electric charge on said tape, further deflection means imparting an oscillatory change in the concentration of charge deposited to control the formation of thickness deformation diffraction gratings along said lines in said tape in response to continuous wide band input information having different spacings corresponding respectively to different frequencies in said wide band input and capable of diffracting monochromatic light by different amounts, means for moving said tape in a direction substantially orthogonal to said lines so that a plurality of adjacent lines are successively recorded, an optical system including a light means for illuminating said tape, an aperture for excluding all but one of said lines at a time from said optical system as said tape is moved, adjustable means for blocking all but the light deviation produced by gratings corresponding to a narrow band of said frequencies of said wide band input in successive lines as said tape is moved, and detection means responsive to the unblocked light to read out only a narrow band of the information recorded.

References Cited

UNITED STATES PATENTS

| | | | |
|---|---|---|---|
| 3,113,179 | 12/1963 | Glenn | 340—173 |
| 3,210,466 | 10/1965 | Day | 340—173 |

BERNARD KONICK, *Primary Examiner.*

J. F. BREIMAYER, *Assistant Examiner.*